United States Patent [19]
Horwitz

[11] 3,880,416
[45] Apr. 29, 1975

[54] FIXTURE ASSEMBLY FOR THE REPAIR OF UNIVERSAL JOINTS

[76] Inventor: Don A. Horwitz, 9024 Karlov Ave., Skokie, Ill. 60076

[22] Filed: Nov. 5, 1973

[21] Appl. No.: 412,602

[52] U.S. Cl. ................. 269/152; 29/200 P; 29/238
[51] Int. Cl. ............................................. B25b 1/10
[58] Field of Search ....... 29/200 P, 200 J, 237, 238; 269/37, 41, 43, 45, 152, 156

[56] References Cited
UNITED STATES PATENTS

| | | | |
|---|---|---|---|
| 288,300 | 11/1883 | Borowsky | 269/156 |
| 731,665 | 6/1903 | Clayton | 269/43 |
| 1,459,093 | 6/1923 | French | 269/156 |
| 1,596,293 | 8/1926 | Neil | 269/156 |
| 2,916,812 | 12/1959 | Milo | 29/237 |
| 3,758,098 | 9/1973 | Vrilakas | 29/237 |

FOREIGN PATENTS OR APPLICATIONS

| | | | |
|---|---|---|---|
| 41-32480 | 5/1966 | Japan | 269/37 |

*Primary Examiner*—Roy Lake
*Assistant Examiner*—Mark S. Bicks
*Attorney, Agent, or Firm*—Kegan, Kegan & Berkman

[57] ABSTRACT

A fixture and the method of utilizing the fixture to hold and secure in place a drive shaft and associated yoke elements during the repair or rebuilding of the universal joint assembly.

The fixture also includes means for accurately centering the cross bars of the universal joint assemblies with respect to the axis of the drive shaft and securing the cross bars fixedly in place within the yokes of the universal assembly, including means for introducing a hardenable plastic into communicating annular grooves in the yoke ears and in the cross bar assembly to hold the two in fixed relative positions.

3 Claims, 7 Drawing Figures

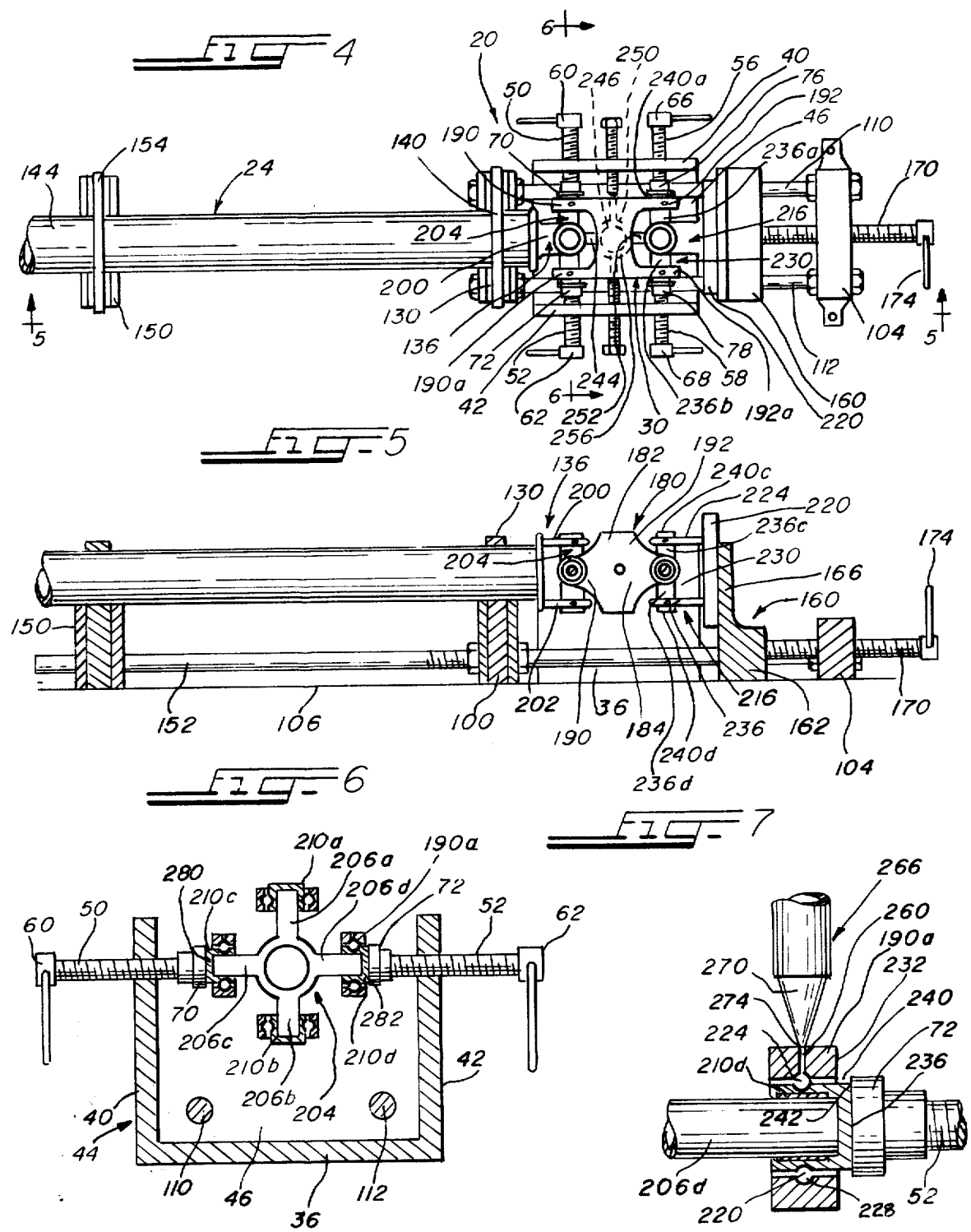

FIXTURE ASSEMBLY FOR THE REPAIR OF UNIVERSAL JOINTS

BACKGROUND OF THE INVENTION

The present invention relates generally to an improved fixture and a method by which universal joint assemblies of the type used in automobiles, trucks, agricultural equipment and the like may be repaired and reconditioned, as required during normal use or in the event of failure of any component element. More particularly the invention is directed to a method and apparatus whereby universal joint assemblies of the constant velocity type may be repaired and component elements replaced accurately and in a practical manner.

Specifically, the fixture and technique of the invention make it possible to repair all constant velocity universal joints even those of the type heretofore considered "unrepairable."

Many types of universals and universal joint assemblies are known in the prior art. One of the more recent developments in this field relates to universal joint assemblies in which the yoke and the cross bar or the sleeve-capped or bearing cup capped trunnions of the cross bar are interlocked by means of a plastic ring or band which fills communicating channels preformed in elements of the cross bar assembly and in the cooperating yoke. When it becomes necessary to replace a component of such a universal joint assembly the practice has been to discard and replace the entire drive shaft and its integrally connected yoke. Until the development of the present invention there was no means available whereby the assembly could be repositioned and precisely aligned and oriented preparatory to interlocking the component parts including replacement parts as necessary. The discarding of the entire assembly because of the failure of a single and relatively minor component of the assembly is a very costly procedure. It is the aim of the present invention to obviate the need to replace the entire mechanism under such conditions and to provide a fixture and method whereby the necessary replacement parts may be installed simply and accurately to provide a completely rebuilt or renovated universal assembly corresponding in all functional aspects to original equipment.

SUMMARY OF THE INVENTION

The invention provides a reliable and simple process for the repair of universal joint assemblies of the type held together as a composite unit by means of a factory injected plastic compound. The maintenance and repair problem which the invention solves pertains to the precise realignment of the component parts of the universal joint assembly, particularly such assemblies of the constant velocity type, and the reestablishment of the assembly as a unitary structure. The invention makes possible the repair of a damaged or worn universal assembly and the rebuilding of that assembly effectively and at low cost, reusing those important structural components which are themselves not damaged or in need or replacement. For example, in accordance with the practice of the present invention the original drive shaft and its associated yoke are retained. Only the worn or damaged cross bars and associated bearing components are replaced. It is an additional important feature of the invention that there is provided a simple yet highly effective means by which the component parts of the universal assembly are interlocked mechanically through the use of a plastic composition introduced as a fluid and hardened in situ.

It is a principal object of the invention to provide a fixture which is effective to hold a drive shaft and a yoke fixed in position, and to adjust and to hold a second yoke fixed relative to the first yoke while the cross bar of the universal assembly is correctly located and centered as required for proper operation.

It is another object of the invention to provide a fixture which will rigidly and firmly hold in place the drive shaft or tube of a universal drive assembly together with the tube yoke attached thereto as well as a cooperating H-yoke or double U-yoke which is secured to the tube yoke through a universal cross bar intercoupling the tube yoke and the H-yoke.

A related object of the invention is to provide a fixture for the securement of the component elements of a universal joint assembly to be reassembled, the fixture including means for accurately positioning or centering the cross bars of the assembly precisely with respect to the longitudinal axis of the tube or drive shaft.

Still another object of the invention is to provide a fixture which may be readily and simply adjusted to ensure, in a constant velocity universal joint assembly including an H-yoke, the accurate positioning and locking in place of the cross bars within the H-yoke, including means to ensure that each cross bar is properly centered transversely of the yoke and with reference to the longitudinal axis of the drive shaft.

Still another object of the invention is to provide a fixture for use in the repair and reassembly of a constant velocity universal joint assembly which includes an H-yoke, the fixture including, in addition to vise means for holding the H-yoke fixed in a selectable position, means for securing the drive shaft and its yoke relative to the H-yoke and means for securing a flange yoke and retaining that yoke in axially stressed compression engagement within the H-yoke whereby the cross bar centers of the tube yoke and the flange yoke may be precisely located in correspondence with the longitudinal axis of the drive shaft.

A related object of the invention is to provide a universal joint assembly repair fixture including adjustment means and securement means for holding the cross bars in precise position during the incorporation into the assembly of a plastic material which, thereafter, hardens in situ to interlock the cross bars with respect to the H-yoke of the assembly.

A further object of the invention is to provide a fixture to facilitate the replacement of cross bars in universal joint assemblies of the constant velocity type, the fixture including means for clamping the drive shaft and its associated yoke in place, vise means to shift and to lock the H-yoke of the assembly in position, and compression means for abutment against the ring collar of a flange yoke of the assembly to neutralize the spring-produced tension thereof.

A related object of the invention is to provide, in a fixture including means for securing the components of a constant velocity universal joint assembly in place, positioning means for centering the cross bars in the H-yoke with respect to the longitudinal axis of the drive shaft, and means defining feeler gauge admitting slots for measuring the spacing between the side wall of the yoke and the cross bar projecting therethrough, thereby to ensure a centering of the cross bar transversely of the H-yoke A general object of the invention is to provide, in the repair of a universal joint assembly of the constant velocity type a simple yet highly effective and relatively low cost fixture which ensures the proper reassembly of the component parts in conformance with the specifications of the manufacturer of the original equipment.

Other objects, features, and advantages of the invention will in part be obvious and will become evident upon a consideration of the following specification considered in conjunction with the drawing.

GENERAL DESCRIPTION OF THE INVENTION

In accordance with the present invention the aims and objects are accomplished by means of a novel fixture facilitating the repair and reassembly of a constant velocity universal joint assembly. The fixture is a support, clamp and gauging device including, in addition to vise means for securing an H-yoke fixed in place, means for supporting a drive shaft or tube and its associated tube yoke and means for supporting an end flange and its associated flange yoke, all as a unitary composite. Additionally, the fixture includes means for shifting the H-yoke (or the cross bars) transversely of a longitudinal axis of the drive shaft and means to facilitate the precise adjustment, transversely of the longitudinal axis of the drive shaft, of the cross bars engaged in the H-yoke and coupling the H-yoke to the drive shaft and to the flange yoke of a constant velocity universal joint assembly.

The fixture of the invention is characterized in that it provides a simple yet highly effective apparatus and method by means of which a constant velocity type universal joint assembly may be repaired or refurbished strictly in conformance with the specifications of the original manufacturer. In dealing with prior art failures in this type of universal joint assembly, it has been necessary to discard and replace the drive shaft or tube which is attached to the tube yoke and to provide a new drive shaft and yoke. The present invention obviates such extravagant waste.

The constant velocity universal joint assemblies of the type in which the present invention finds utility utilize as a means for locking the cross bars in the universal yokes a plastic material which is introduced into communicating grooves formed respectively in the trunion receiving sockets of the yoke ears or arms and around the trunion capping bearing cups. The fixture of the invention is used to center the cross bar within the yoke and on a line with the longitudinal axis of the drive shaft. Thereafter, a fluid plastic material is injected into communicating annular grooves of the cooperating cross bar and yoke elements which are thereby interlocked when the plastic hardens in situ to form a ring or band. In accordance with the practice of the invention there is provided, for use in conjunction with the fixture, a dispensing cartridge which includes a reservoir tube terminating in a probe and orifice by means of which the plastic material is injected to fill the annular cooperating channels formed in the bearing caps of the cross bar and the sockets formed in the arms or ears of the H-yoke of the universal joint assembly.

BRIEF DESCRIPTION OF THE DRAWINGS

The invention will be more specifically and more fully described in connection with the accompanying drawings in which:

FIG. 4 is a top plan view of the fixture of the invention showing the H-type universal joint assembly, the drive shaft tube and its associated yoke, and the flange or ring collar and its associated yoke, all secured in and held by the fixture;

FIG. 5 is a cross sectional view taken substantially on the lines 5—5 of FIG. 4 and showing the support elements of the fixture of the invention in section;

FIG. 6 is a cross sectional view taken substantially on the line 6—6 of FIG. 4 and showing the manner in which the push plates carried on the ends of the screws of the fixture abut and press against the bearing cup capped trunnions of the cross bar of the universal joint assembly; and FIG. 7 is an enlarged fragmentary view, partially in section, and illustrating the manner in which the plastic material is forcibly introduced into the annular communicating grooves or channels formed in the trunion capping bearing cups and the walls bounding the bearing cup receiving sockets of the yoke of the universal joint assembly.

DESCRIPTION OF THE PREFERRED EMBODIMENT

Figure 1:
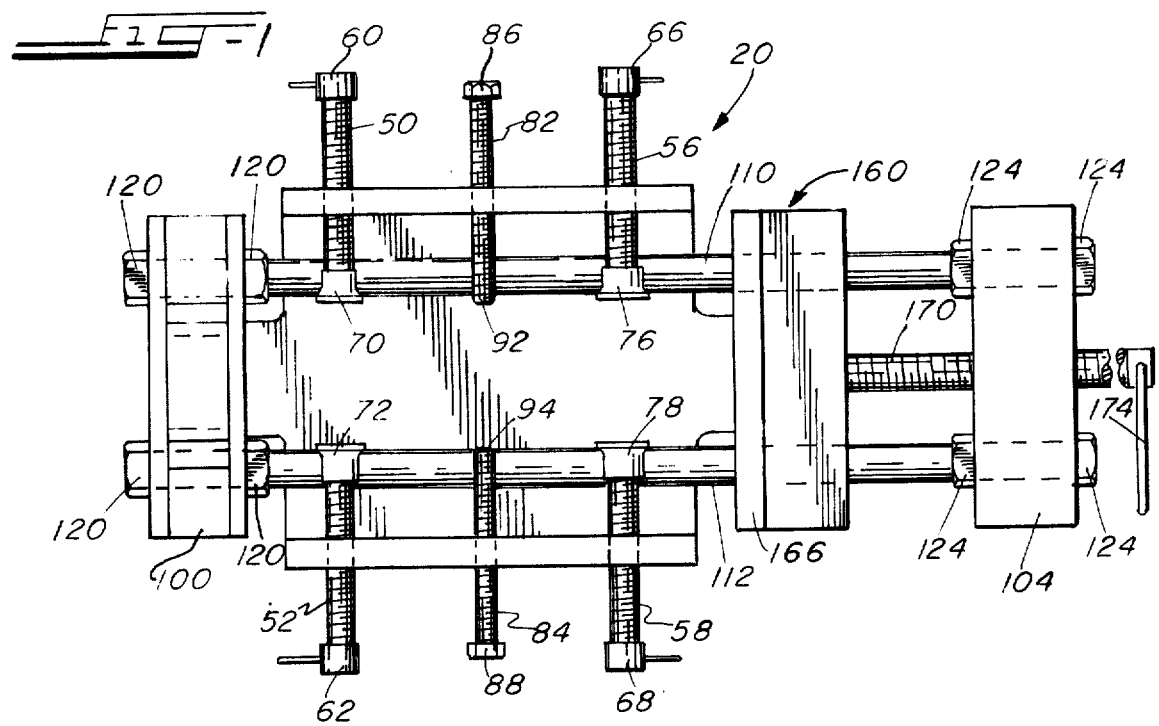
FIG. 1 is a top plan view of a preferred embodiment of the fixture of the invention.
Figure 2:
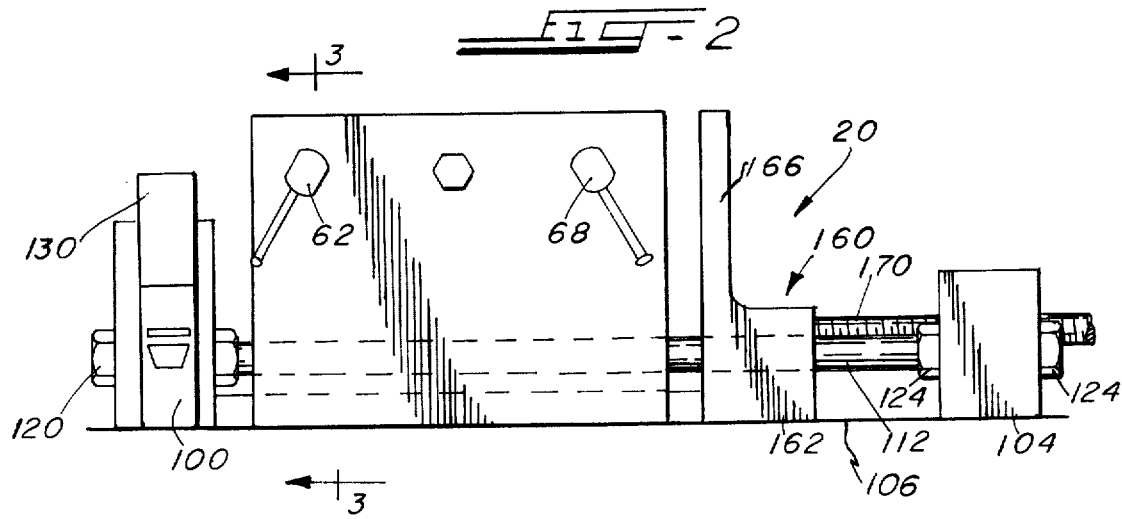
FIG. 2 is a side elevational view of the fixture of FIG. 1.
Figure 3:
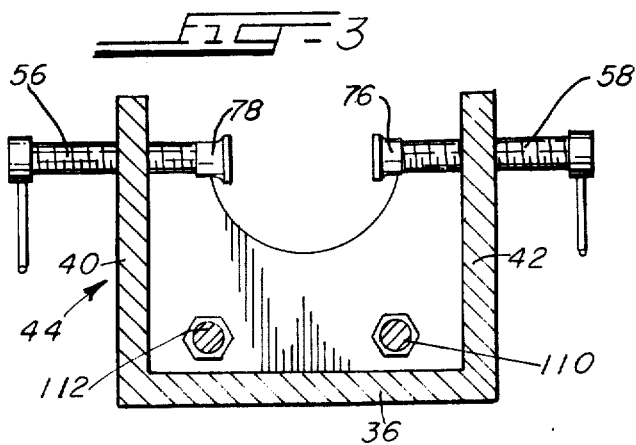
FIG. 3 is a cross sectional view taken substantially on the lines 3—3 of FIG. 2.

Referring now to the drawings, and particularly to FIGS. 1, 2, 3 and 4, there is shown, for the purpose of illustrative disclosure, a preferred embodiment of one form of the fixture of the invention. As illustrated, the invention constitutes a fixture 20 which serves as a support and clamp or holder for securing a drive shaft or drive tube 24 (FIG. 4) and an H-type universal joint assembly or a double U-universal joint assembly 30 in place. The fixture 20 includes a horizontal base or floor plate 36 and a pair of opposed side walls 40 and 42 forming a cradle 44 defining a yoke-receiving channel 46. Extending through and threadedly engaged in the side walls 40 and 42 are two pair of opposed screws or threaded shafts 50 and 52 and 56 and 58. At their outer ends the shafts are provided with bar-type handles 60, 62, 66 and 68 by means of which the shafts are rotated in the threaded walls 40 and 42 for advancement into and retraction from the channel 46.

At their inwardly directed ends, the shafts 50, 52, 56 and 58 carry push plates 70, 72, 76 and 78 the flat faces of which are adapted to engage and bear against cross bar elements of the H-yoke assembly as will be explained more fully herebelow. Also threadedly secured in and extending through the opposed side walls 40 and 42 are a pair of vise rods 82 and 84 of general bolt configuration and formed with hexagonal heads 86 and 88 rotatable by wrench whereby the inwardly directed ends 92 and 94 of the rods 82 and 84 may be brought into firmly flocking engagement against the outer walls of the H-yoke 30.

A pair of anchor blocks 100 and 104 at opposed ends of the fixture walls are secured to a supporting table 106, the blocks 100 and 104 being connected by a pair of rods 110 and 112 which bridge the floor 36 of the yoke cradle 44. The ends of the rods are fixedly secured in the opposed blocks 100 and 104 by means of nuts threaded on the rod ends.

In the embodiment of the invention illustrated, the block 100 is provided with a U-shaped or V-shaped adapter 130 sized to seat and support that end of the drive shaft or tube 24 proximate the drive shaft-connected yoke 136. A locking band or strap secured to the support block 100 holds the tube 24 securely in place, as indicated in FIG. 4. The opposite end of the drive shaft 24 is supported on a second block or standard 150 connected by a bar 152 to the support block 100 and is held fixed in position by means of a band clamp 154.

A ring collar push plate or abutment plate 160 consisting of a base 162 and integrally formed and upwardly extending wall 166 is slidably carried on the rods 110 and 112 at a location between the block 104 and the H-yoke cradle 44. A rod or screw 170 is threadedly engaged in and extends through the block 104 and is coupled to the base 162 of the abutment plate 160 to advance and retract the abutment plate 160 for purposes which will become evident hereinafter. A suitable handle bar 174 facilitates the turning of the threaded shaft 170.

The overall structure of the fixture of the invention having been described, the method of its use with the universal joint will be more readily understood. Referring now to FIGS. 4 and 5, the universal joint assembly is shown as including a bilaterally symmetrically H-yoke or double U-yoke housing or forging 180 which, in form, is two U-shaped yokes 182 and 184 joined at their backs with their arms or ears extending in opposite directions. The respective arms 190 and 190a and 192 and 192a are in line to provide equivalent U-shaped openings at each end of the H-yoke 180. A single U-shaped yoke 136 is integrally connected to the end of the tube or drive shaft 24, the parallel ears 200 and 202 of the yoke 136 being shifted angularly 90° with respect to the cooperating facing ears 190 and 192 of the H-yoke 30. The shaft yoke 136 and the left half 182 of the H-yoke 30 are interlinked or coupled by means of a coss bar or spider 204 consisting of four radially extending cross arms or trunnions 206a, 206b, 206c and 206d. The ends of the trunnions are capped with bearing cups 210a, 210b, 210c and 210d, the latter being fixed on the trunnions against axial shifting with respect thereto (FIG. 6).

The right half 184 of the H-yoke 30 of the universal joint assembly is connected, through its ears 192 and 192a to a flange yoke 216 consisting of a plate-like flange 220 extending, as shown, generally normally to the longitudinal axis of the drive shaft 24 and a pair of arms 224 and 226 secured to and extending generally normally to the flange 220 and directed inwardly therefrom and toward the H-yoke 30. The flange yoke 216 is coupled to the H-yoke 30 is by means of a second cross bar or spider 230 which, in all material respects, is the same as the cross bar 204 at the other end of the H-yoke assembly, and the trunnions 236a, 236b, 236c and 236d of the cross bar 230 are also capped at their ends with bearing cup caps 240a, 240b, 240c and 240d.

In the example of the constant velocity universal joint assembly shown the cross bar 204 which is connected to the drive shaft yoke 136 has attached thereto a stub shaft or boss 244 terminating in an integrally formed ball 246, the shaft and ball extending normally to the cross bar 204, as indicated in FIG. 4. A cooperating socket-defining wall structure 250 carried on a stub shaft 252 is secured to and constitutes an inwardly directed extension of the cross bar 230 projecting generally normally of the plane of that cross bar. The ball and socket are tensioned axially by means of a spring 256.

It will be understood by those skilled in universal assemblies that one pair of trunnions of the cross bar is pivotally supported, along a first axis, in the sockets formed in the ears or arms of a first yoke while the other set of trunnions is similarly supported in the sockets formed in the ears of a second yoke. In the particular example of the universal joint assembly illustrated, the first cross bar 204 interconnects the yoke 136 of the drive shaft 24 with a first yoke 182 of the H-yoke 30 of the assembly. The second cross bar 230 has one set of its opposed arms or trunnions extending into the flange yoke 216 while the second set of cross arms or trunnions seat in the ears of the second half 184 of the H-yoke 30. In positioning the yokes on the cross bar or trunnions it is crucial that the center point of the cross bar be equidistant from each ear of the yoke and on the longitudinal axis of the drive shaft or of the flange yoke assembly to which the cross bars are connected. The trunnion ends are capped with bearing cups secured against axial shifting but permitting cross bar rotation. Thus, it is actually the bearing cup caps which project into and which must be secured within the sockets formed in the ears or arms of the yokes.

In the type of universal joint assemblies to which the present invention is directed each bearing cup is locked within a socket of the yoke, as shown in FIG. 7, by means of a ring or band 220 of a hardened plastic composition which fills completely the annular cavity 222 formed by facing and communicating annular grooves or channels 224 and 228 in the inner face of the sockets in the yoke ear 190a and the facing encircled outer annular surface of the bearing cup cap 210d, the two channels being in encircling overlying relationship when the assembly is properly aligned.

Referring now to FIGS. 6 and 7 the bearing cap 210d is shown (FIG. 7) as projecting or protruding axially of the trunion 206d somewhat beyond the outer edge of the yoke ear or tab 190a to define between the outer edge 232 of the yoke ear 190a and the outer extremity of the bearing cap 236 a space or slot 240 which, in FIG. 7, appears between the inside edge 242 of the push plate 72 and the edge 232 of the yoke ear.

In the repair of a universal joint assembly of the type described and requiring the replacement of the cross bars or spiders and their associated bearing caps, it is essential that the cross bar be accurately centered between the opposed arms of each yoke into which the trunions of the cross bar are received. In accordance with the practice of the invention, as a first step, the replacement cross bar is positioned so that a first pair of the bearing cup capped trunions 206a, 206b extends through opposed sockets in the bearing shaft yoke 136. The outside diameter of the bearing cups 210a and 210b is such as to provide a "press fit" in the yoke 136. The difference in the overall linear length of the capped cross bar elements and the overall width of the yoke as measured at "flats" on the outer surfaces of the yoke ears 200 and 202 (FIG. 5) is ascertained and pressure is then applied axially to center that cross bar 206 so that its ends extend equally beyond the flats of the yoke ears. The same technique is carried out to achieve a force fit centering of the cross bar 230, and more particularly the trunions 236c and 236d within the flange yoke 216 at the opposite end of the universal assembly. With the two cross bars centered in the tube yoke 136 and flange yoke 216, there is an exact alignment of the channel grooves in the cooperating elements, as indicated schematically in FIG. 7. A radial bore or passage 260 extends through the yoke ear and communicates with the channel 224 on the inner surface of the ear and the facing channel 228 in the trunion cap whereby a plastic material may be forcibly introduced by means of a cartridge assembly 266 having a probe or filler cone portion 270 terminating in a discharge orifice 274, as shown in FIG. 7. The plastic composition exudes from the orifice 274, passes through the passage 260, and fills the communicating annular channels 224 and 228 thereby to form a ring or band 220. The plastic then hardens in situ to establish a firm mechanical interlock between the yoke and the cross bar.

The other of each of the pairs of cross arms of the cross bars is now centered within the H-yoke 30 using the fixture of the invention. Considering first the cross bar 204 which connects the H-yoke 30 to the drive shaft yoke 136, the threaded shafts 50 and 52 are adjusted by means of the handles 60 and 62 to bring their respective push plates 70 and 72 into abutment against the outer end surfaces of the bearing cups 280 and 282 capping the trunnions 206c and 206d, as shown in FIG. 6. The space 240 between a ground flat 232 of the tab 190a of the H-yoke 30 and the end face 242 of the push plate 72 is measured by means of a feeler gauge, as is the spacing between the corresponding parts at the opposite end of the cross bar, between the push plate 70 and the bearing cap 280. With these spacings known, the jack screws 82 and 84 are adjusted to position and lock the H-yoke 30 transversely of the supporting fixture 20 so that the spacings 240, on either side of the H-yoke 30 between the yoke and the push plates is precisely equal.

In accordance with the preferred technique which constitutes an element of the present invention, whereas the first set of trunions were press fit into the cooperating sockets of their respective yoke ears, the latter operations described above are preferrably carried out with the bearing cup caps projecting into the cooperating sockets of the yokes as "slip fits".

During the steps of positioning and centering the cross bars in their respective yokes at the opposite ends of the H-yoke 30, it is important to relieve the spring tension in the ball 246 and socket 250 assembly carried by and intercoupling the two cross bars of the assembly. In accordance with the practice of the invention this is accomplished by means of the abutment plate assembly 160 the flange 166 of which is urged against the ring collar 220 of the flange yoke 216 by means of the threaded shaft 170 carried by the anchor block 104, as indicated in FIG. 5.

With the cross bars 204 and 230 centered and held in their proper positions within their corresponding yoke elements 190, 190a and 192 and 192a there is exact alignment of the annular grooves formed in the bearing cup caps and in the yoke ears. The fluid plastic composition is injected at the port 274, through the passage 260 to fill the annular groove 220 to form an O-ring which hardens in situ to lock the metal components together, as previously described. Since the cross bars are press fit in the tube yoke and the flange yoke, the injection of plastic into these assemblies may be carried out at the same time the H-yoke is injected, rather than earlier as described. No heat or other special treatment is necessary to harden the plastic, since the composition, as injected, includes a curing catalyst. Particularly suitable plastic compositions are the well known epoxides. The time required to allow complete polymerization or hardening of the plastic is ordinarily about one to two hours after which the entire assembly may be removed from the supporting fixture and put into use.

While a preferred embodiment of the novel fixture and the technique of the invention have been illustrated and described, it is understood that the same is capable of modification and that such modifications may be made without departure from the spirit and scope of the invention as defined in the appended claims.

What is claimed is:

1. A fixture to facilitate the repair and replacement of worn and damaged parts of a universal joint assembly of the type including a drive shaft carried yoke and a second yoke coupled thereto by a cross bar, said cross bar having four trunnions and a bearing cup capping and fastened to each said trunnions, each yoke having a pair of bearing cup receiving sockets formed in opposed arms thereof, the bearing cup capped trunnions projecting into said sockets with portions of each bearing cup extending beyond said sockets outwardly of said arms of said yokes, and means securing said bearing cups and said trunnions in said sockets of each yoke mechanically to intercouple the yokes with one another through said cross bar, said fixture comprising a base and a pair of opposed, upstanding side walls, support means for cradling and holding a yoke-carrying end portion of said drive shaft in place between said side walls of said fixture, a pair of shaft means threadedly secured in said opposed side walls of said fixture for controlled movement transversely inwardly and outwardly thereof, said shaft means having end faces directed inwardly of each said walls and adapted to abut and bear against corresponding facing end surfaces of said bearing cups to shift said cups and the cross bar axially within said sockets and center the cross bar within the second yoke, push plates carried on each said shaft means of said fixture at inwardly projecting ends thereof for in-line abutment against said cups capping said trunnions of the cross bar, the overall radial expanse of said push plates exceeding that of said cups whereby marginal portions of said push plates extend radially beyond said cups to define a gauging slot between said marginal portions of said push plates and facing walls of the second yoke, vise means carried by said fixture and shiftable inwardly of said opposed side walls thereof to bear against and to hold the second yoke in selectable positions between said walls of said fixture, flat areas on outer surfaces of walls of the second yoke constituting reference planes for positioning the cross bar transversely of the yoke to establish the intersection of the cross bar on a longitudinal axis of the drive shaft, whereby, when abutted against said bearing cups, said marginal portions of said push plates of said fixture and the flat areas of the second yoke define therebetween at opposed ends of the cross bar a slot adapted for insertion of feeler gauges therewithin to facilitate the transverse centering of the cross bar with respect to the second yoke and the longitudinal axis of the drive shaft.

2. The structure as set forth in claim 1 wherein the second yoke is an H-yoke carrying a second cross bar, and wherein said fixture includes a second pair of shaft means threadedly secured in opposed side walls for controlled shifting of the second cross bar inwardly and outwardly for centering thereof within said yoke and with reference to said longitudinal axis of the drive shaft.

3. The structure as set forth in claim 1
wherein said fixture includes an abutment plate and drive means to move said abutment plate endwise of said fixture and into positive abutment with a ring collar of the second yoke to hold the second yoke in tensioned engagement axially of the drive shaft.

* * * * *